J. E. JOHNSON.
CASTER.
APPLICATION FILED JUNE 14, 1909.
942,565.
Patented Dec. 7, 1909.
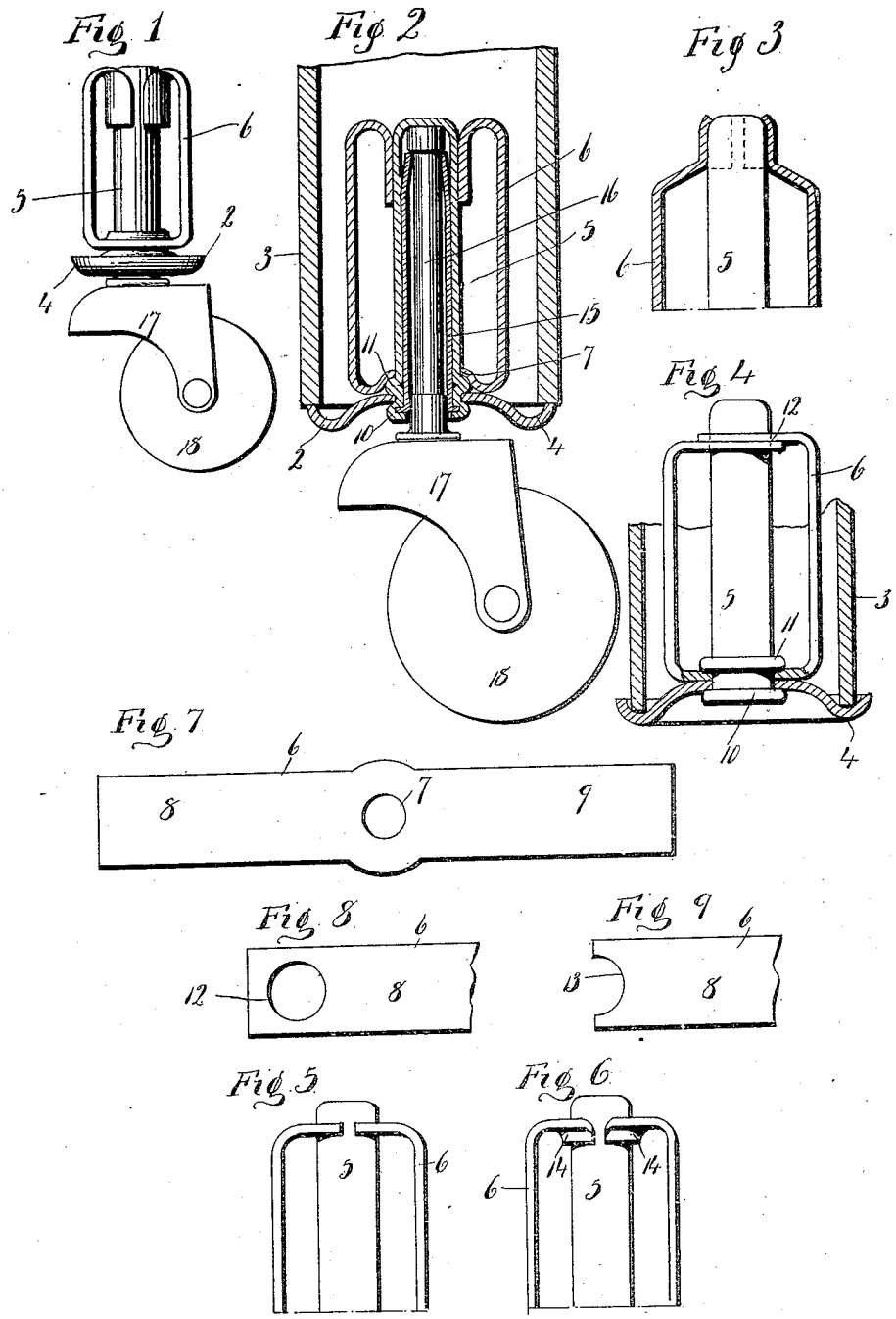

UNITED STATES PATENT OFFICE.

JOSEPH EDWARD JOHNSON, OF MERIDEN, CONNECTICUT.

CASTER.

942,565.　　　　　Specification of Letters Patent.　　Patented Dec. 7, 1909.

Application filed June 14, 1909. Serial No. 502,071.

*To all whom it may concern:*

Be it known that I, JOSEPH EDWARD JOHNSON, a citizen of the United States, residing at Meriden, in the county of New Haven and State of Connecticut, have invented a new and useful Improvement in Casters; and I do hereby declare the following, when taken in connection with the accompanying drawings and the numerals of reference marked thereon, to be a full, clear, and exact description of the same, and which said drawings constitute part of this specification, and represent, in—

Figure 1 a side view of a caster embodying my invention. Fig. 2 a sectional view of the same on an enlarged scale and shown as inserted into a tubular leg. Fig. 3 a broken sectional view illustrating a modified form of the bearing of the upper end of the frame against the socket. Fig. 4 a side view partially in section of a modified form of my caster. Figs. 5 and 6 are broken views of the upper ends of the socket showing modified forms of bearings for the upper ends of the frame against the socket. Fig. 7 a plan view of the strip from which the frame is formed. Figs. 8 and 9 are broken views of one end of the strip illustrating modifications.

This invention relates to an improvement in casters, and particularly to casters for metal beds.

In the usual construction of casters for metal beds, the pintle is mounted in a frame or casing which is adapted to be inserted into the leg of a bed, and the pintle is fixed in the casing so that the wheel portion cannot be removed without removing the casing with it.

The object of this invention is to provide a caster for metal beds including a casing which may be inserted into the leg of a bed and into which the pintle of the caster wheel may be readily inserted or removed; and the invention consists in the construction hereinafter described and particularly recited in the claims.

The frame consists of a track plate 2 which is of a diameter to bear upon the edge of the leg 3 of a bed or other piece of furniture, as shown in Fig. 2 of the drawings, or to extend slightly beyond the edge as shown in Fig. 4 of the drawings. This track plate is slightly cup-shaped forming an annular bearing surface 4 which provides a smooth surface at the end of the leg when the caster is removed. Connected with this track plate is a tubular socket 5 which preferably corresponds to the tubular socket, shown and described in Letters Patent No. 909,305 granted January 12, 1909. Around this tubular socket is a frame 6. This may be formed from a strip of metal having a perforation 7 at the center to closely fit over the socket 5. The ends 8 and 9 of this strip are turned upward, and the extreme ends turned downward against opposite sides of the socket. The width of the ends 8 and 9 is such that the edges will bear against the inner surface of the leg 3 with sufficient friction to remain in the bed.

The track plate 2 may be secured to the socket between two annular ribs 10 and 11 as shown in Fig. 2 of the drawings, and the strip rest upon the upper rib 11 or the frame strip and the track plate may be secured between the two ribs as shown in Fig. 4 of the drawings.

Instead of turning the ends 8 and 9 of the strip downward as shown in Fig. 2 of the drawings, they may be turned inward and upward against the socket as shown in Fig. 3 of the drawings; or, if desired, the ends may have perforations 12 which set over the upper end of the socket as also shown in Fig. 4 of the drawings. Or the ends may have segmental notches 13 as shown in Fig. 9 of the drawings to abut against the sides of the socket as shown in Fig. 5 of the drawings, or these notched ends may be bowed forming flanges 14 to bear against the sides of the socket as shown in Fig. 6 of the drawings.

Within the socket I preferably arrange a sleeve-like spring 15 as in my previous patent into which the pintle 16 of the caster horn 17 may extend, the horn carrying the usual wheel 18. Or the socket may be formed like the sockets of any known construction, it only being essential that the socket shall be connected with the frame so that the pintle may be removed from the frame without withdrawing the frame from its position in the leg of the furniture.

I claim:—

1. A caster comprising a socket, a sleeve-like spring in said socket into which a caster pintle may be inserted and removed, a track plate coupled with said socket and adapted to form a bearing for the lower end of a hollow leg, a frame mounted on said socket and comprising a strip having a perforation through which the socket passes, said strip extending upward and bearing at its upper ends against the sides of said socket.

2. A caster comprising a socket into which a caster pintle may be inserted and removed, a track plate coupled with said socket and adapted to form a bearing for the lower end of a hollow leg, a frame mounted on said socket and comprising a strip having a perforation through which the socket passes, said strip extending upward and bearing at its upper end against the sides of said socket, the ends of the strip extending upward and turned downward against the sides of said socket.

In testimony whereof, I have signed this specification in the presence of two subscribing witnesses.

JOSEPH EDWARD JOHNSON.

Witnesses:
GEORGE M. BEERS,
FREDERIC C. EARLE.